(12) United States Patent
Wajih et al.

(10) Patent No.: US 8,694,423 B2
(45) Date of Patent: Apr. 8, 2014

(54) SYSTEMS AND METHODS FOR BROKERING DATA IN A TRANSACTIONAL GATEWAY

(75) Inventors: Abu Reza M. Wajih, Houston, TX (US); Gregory A. Andrews, Houston, TX (US); Jiaxi Mao, Katy, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2375 days.

(21) Appl. No.: 10/851,619

(22) Filed: May 21, 2004

(65) Prior Publication Data

US 2005/0262025 A1 Nov. 24, 2005

(51) Int. Cl.
*G06Q 40/00* (2012.01)

(52) U.S. Cl.
USPC .................................. 705/39; 705/35; 705/38

(58) Field of Classification Search
USPC ....... 709/206, 217; 707/10; 713/201; 705/35, 705/38, 39
See application file for complete search history.

(56) References Cited

U.S. PATENT DOCUMENTS

| | | | | |
|---|---|---|---|---|
| 5,615,277 A * | 3/1997 | Hoffman | ........................ | 382/115 |
| 6,405,922 B1 * | 6/2002 | Kroll | ............................... | 235/379 |
| 6,697,811 B2 * | 2/2004 | Brodsky | ................................ | 1/1 |
| 2002/0198810 A1 * | 12/2002 | Roger | ............................. | 705/36 |
| 2003/0126229 A1 * | 7/2003 | Kantor et al. | ................. | 709/217 |
| 2003/0187853 A1 * | 10/2003 | Hensley et al. | ................. | 707/10 |
| 2003/0188198 A1 * | 10/2003 | Holdsworth et al. | ......... | 713/201 |
| 2004/0019645 A1 * | 1/2004 | Goodman et al. | ............ | 709/206 |
| 2005/0132008 A1 * | 6/2005 | Brown et al. | ................. | 709/206 |

\* cited by examiner

*Primary Examiner* — Thomas M. Hammond, III
*Assistant Examiner* — John Scarito

(57) ABSTRACT

Systems and methods for brokering data are invented and disclosed. A system for producing a data model comprises a message broker, filters, and a data collector. The message broker includes an interface configured to receive client requests from a plurality of communication devices, a transaction request identifier configured to identify a plurality of parameters associated with a client request, and a router configured to distribute the request responsive to at least one of the parameters. The filters are coupled to the router and apply and apply respective tests for determining when the client request should be processed by the system. The data collector is coupled to the message broker and forwards data from the client request to at least one of a plurality of data stores when at least one of the filters indicates that the client request should be processed by the system.

15 Claims, 7 Drawing Sheets

SYSTEMS AND METHODS FOR BROKERING DATA IN A TRANSACTIONAL GATEWAY

BACKGROUND

A number of transactional systems are used to integrate an enterprise with financial institutions. Many of these transactional systems include payment processing via multiple third-party vendors that provide transactional service interfaces between the financial institutions and the enterprise. Historically, automated payment processing systems have been implemented in accordance with the data requirements associated with the particular client and the type of transaction. This approach has led many enterprises to implement multiple solutions for processing data between clients and the enterprise and the enterprise and financial institutions.

Automated payment processing systems include a host of vastly different data requirements both for transactions between the client and the enterprise and for transactions between the enterprise and financial institutions. For example, transactions between a client and an enterprise range from one-time purchases of goods and services, requests for quotes, requests for changes to a previous order, requests associated with interactive product configuration tools, credit transactions, and the like. Generally, transactions between an enterprise and a financial institution include credit and fund transfer requests on behalf of clients with previously established accounts with the various financial institutions. These transactions can include requests for increases to credit limits, risk analysis, etc. Using multiple payment processing solutions across an enterprise creates a heavy financial burden for businesses to coordinate with clients, application interface providers, and internal departments to develop the various solutions. Once the solutions are implemented, the enterprise has the additional financial burden of operating and maintaining the various systems.

SUMMARY

An embodiment of a system for producing a common data model comprises a message broker, filters, and a data collector. The message broker includes an interface configured to receive client requests from a plurality of communication devices, a transaction request identifier configured to identify a plurality of parameters associated with a client request, and a router configured to distribute the request responsive to at least one of the parameters. The filters are coupled to the router and apply and apply respective tests for determining when the client request should be processed by the system. The data collector is coupled to the message broker and forwards data from the client request to at least one of a plurality of data stores when at least one of the filters indicates that the client request should be processed by the system.

An embodiment of a method for brokering data in a transactional gateway comprises receiving a client request, identifying a characteristic of the client request, routing the client request responsive to the characteristic, identifying when the client request meets at least one condition indicative that the client request should be denied; and when the client request fails to meet the at least one condition indicative that the client request should be denied, storing select data from the client request in accordance with a data model that comprises a superset of vendor defined data formats for application interfaces that process financial transactions.

BRIEF DESCRIPTION OF THE DRAWINGS

Systems and methods for brokering data in a transactional gateway are illustrated by way of example and not limited by the implementations in the following drawings. The components in the drawings are not necessarily to scale, emphasis instead is placed upon clearly illustrating the principles of the data broker. Moreover, in the drawings, like reference numerals designate corresponding parts throughout the several views.

DETAILED DESCRIPTION

The systems and methods for brokering data in a transactional gateway provide a standard enterprise solution for processing requests between clients (internal and external) and the enterprise and between the enterprise and financial institutions. The brokering system provides a common and best practices approach to transaction request logging, handling, data security, privacy, and the like. The brokering system provides a middleware solution that includes a message broker to a centralized data structure that serves internal enterprise business processes as well as third-party vendor processes. The data broker provides a universal interface for the processing of services—internal or external (third parties). It is scalable horizontally (increased throughput) and vertically (varied services). The data structure comprises a superset of data selected from various client requests stored and mapped in accordance with the data requirements of third-party transaction service providers.

The message broker receives client requests from a plurality of different communications devices including telephones, wired and wireless communication devices, network coupled computers, etc. The message broker identifies the client, the source device that communicated the request, the nature of the underlying transaction, and in some cases the client location. The message broker identifies this information in accordance with keys and attributes extracted from the client request. The message broker routes the client request in accordance with the extracted keys and attributes to various filters. The filters apply one or more tests designed to establish whether and how the client request should be processed. The filters comprise an adaptive client filter and perform address authentication, rate adjustments, etc. The message broker also includes a data collector that selectively extracts, formats, and stores data from the client request across a plurality of data stores.

A data mapper couples the data structure to third-party application interfaces, which manage payment processing transactions on behalf of financial institutions. Embodiments of the data mapper include a formatter and a translator. The formatter arranges data in accordance with defined data requirements. The translator decrypts data when the data is stored in an encrypted form and reencrypts data in accordance with a scheme recognizable by the particular third-party application.

The data structure provides a secure and adaptive solution for integrating existing and future enterprise knowledge based applications and data mining applications, while providing access to third-party vendors to enterprise data.

Figure 1:
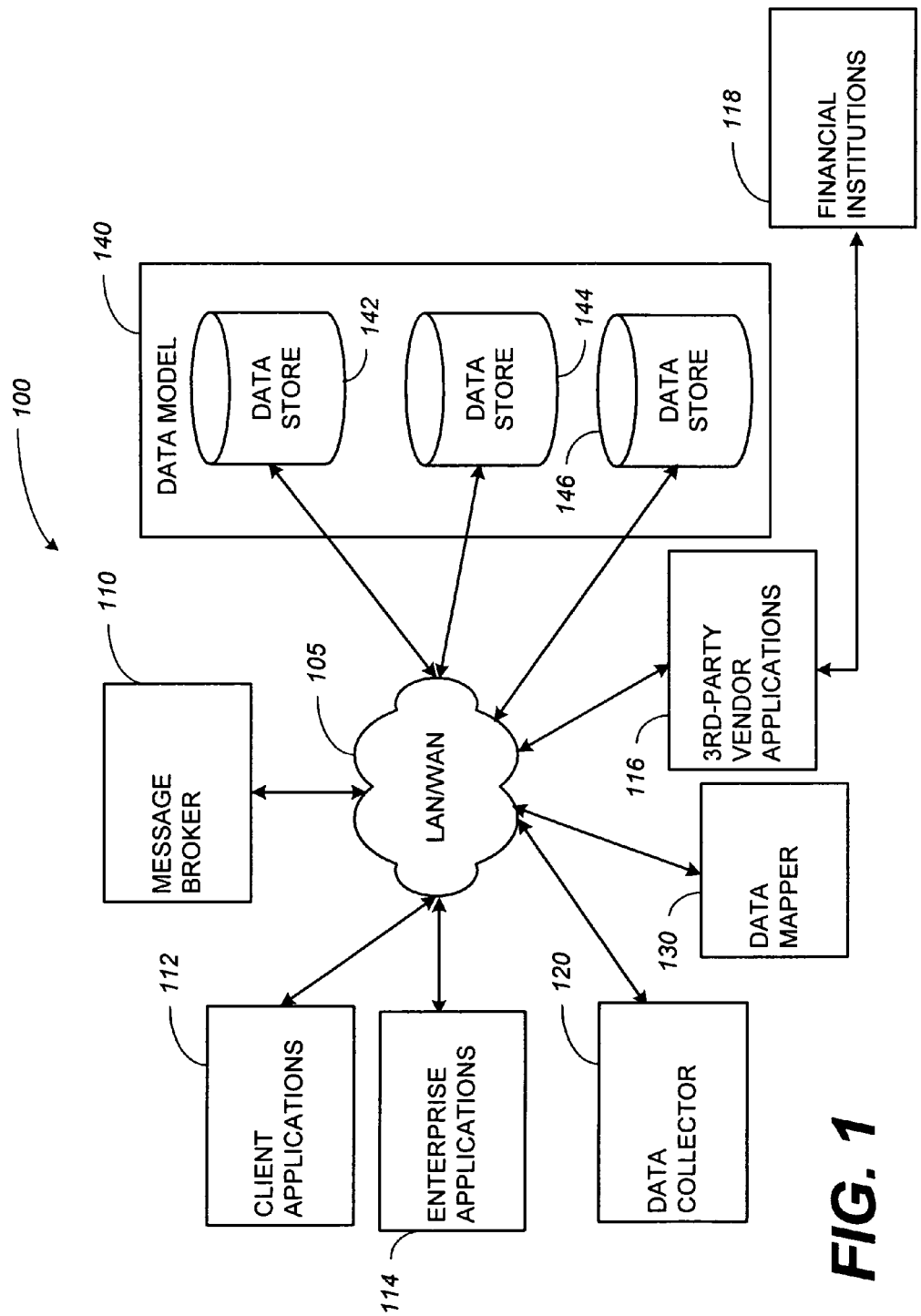
FIG. 1 is a schematic diagram illustrating an embodiment of a transactional gateway well suited for a data brokering system.

Reference will now be made in detail to the description of the brokering systems and methods as illustrated in the drawings. Reference is made to FIG. 1, which illustrates an embodiment of a transactional gateway suitable for the data brokering system. Transactional gateway 100 comprises a plurality of functional modules in an automated processing system that receives client requests via client applications 112 and communicates select data via network 105 and third-party vendor application 116 to financial institutions 118. In the embodiment illustrated in FIG. 1, each of the functional modules is coupled to one another via network 105. Functional modules include message broker 110, enterprise applications 114, data collector 120, data mapper 130, and data model 140.

Network 105 can comprise any local area network (LAN) or wide area network (WAN). When the network 105 is configured as a LAN, the LAN could be configured as a ring network, a bus network, and/or a wireless local network. When the network 105 takes the form of a WAN, the WAN could be the public-switched telephone network (PSTN), a proprietary network, and/or the public access WAN commonly known as the Internet. When the functional modules are coupled to each other via a LAN, communication links to client applications 112 and third-party vendor applications 116 may include one or more links over other networks such as the PSTN, a circuit-switched network, and the Internet, a packet-switched data network. Regardless of the actual network or networks used in particular embodiments, data is exchanged using various communication protocols. For example, transmission control protocol/Internet protocol (TCP/IP) is used when network 105 is the Internet. Proprietary data communication protocols may be used when the network 105 is a proprietary LAN or WAN.

Client applications 112 transfer data via an enterprise to financial institutions 118. The enterprise uses message broker 110, data collector 120, and data model 140 to selectively pre-filter, format, and store select data associated with client requests. Client requests are communicated via client applications 112 and include such transactions as requests for quotes, inventory information, product configuration in association with lease/purchase decision tools, enterprise credit, etc. Responses are generated and communicated to client applications 112 via message broker 110, enterprise applications 114, and third-party vendor applications 116.

As shown in FIG. 1, data model 140 comprises a plurality of data stores including data store 142, data store 144, and data store 146. Each of the data stores 142, 144, 146 can be co-located with one another or distributed geographically. Each of the data stores 142, 144, 146, may comprise a redundant array of independent disks (RAID), which provide additional data security. Transactional data stored within the data model is in arranged via data collector 120, which generates a superset of data formats to comply with third-party vendor applications 116. Each respective set within the superset is configured in accordance with data requirements associated with a particular third-party vendor interface. Data within the data model is arranged in a hierarchical structure within a class.

Once select transactional data has been stored within data model 140, the transactional data is available when appropriate for extraction by third-party vendor applications. Third-party vendor applications 116 include payment-processing services such as credit card authentication, client identification, credit scoring or other risk analysis, fund transfers, and fraud identification, among others.

Select transactional data stored within data model 140 is also available for extraction and analysis via enterprise applications 114. Enterprise applications 114 include product configuration tools, leasing and purchase modules, proprietary credit analysis, financing modules among other business decision-making modules.

Figure 2:
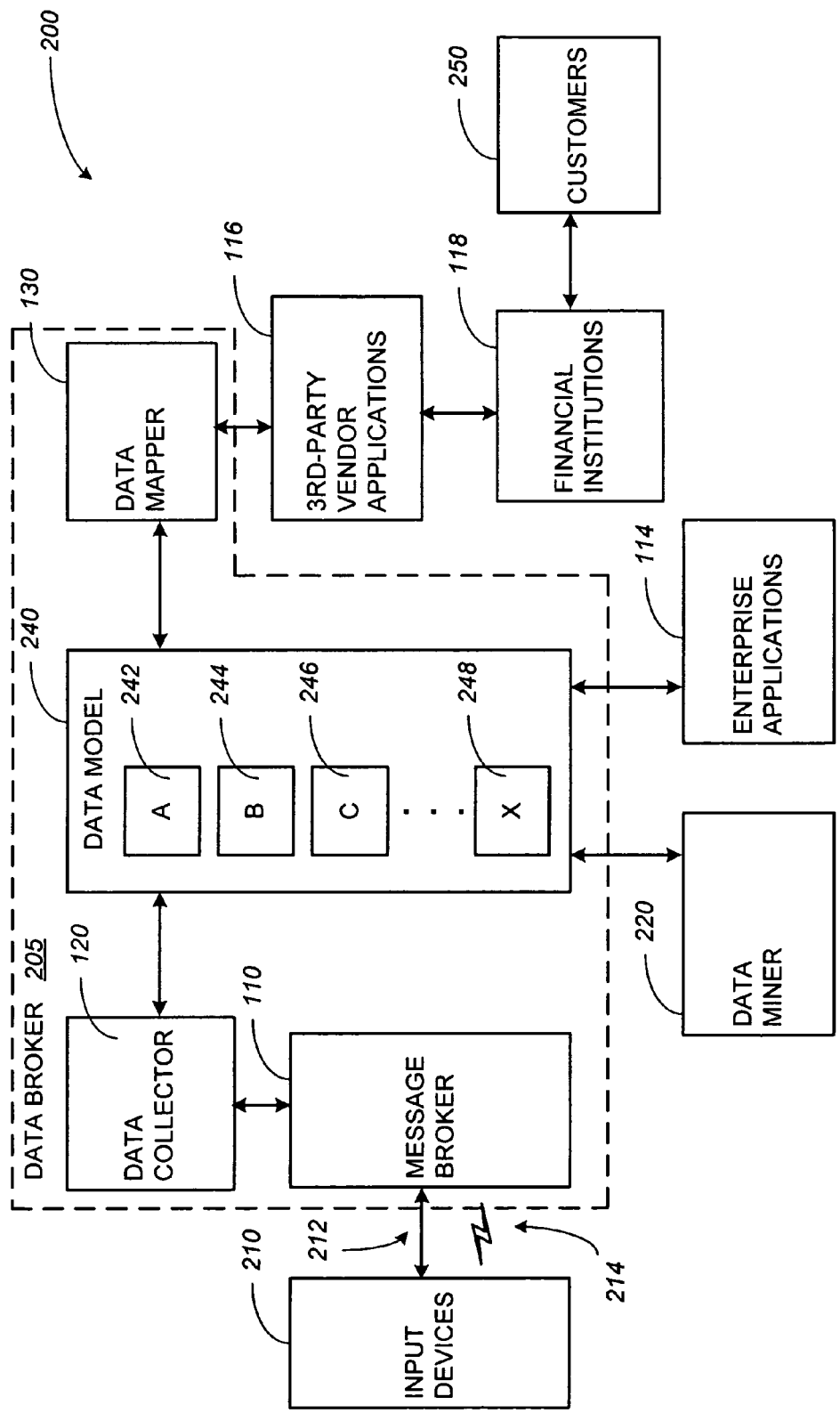
FIG. 2 is a functional block diagram of an embodiment of a data broker.

FIG. 2 is a functional block diagram of an embodiment of a data broker. Data broker 205 comprises message broker 110, data collector 120, data model 240, and data mapper 130. Data broker 250 is in communication with and interposed between input devices 210 associated with client applications 112 (FIG. 1) and third-party vendor applications 116 that communicate with financial institutions 118 and their respective customers 250. Data broker 205 is further coupled to enterprise applications 114 and data miner 220. Data broker 205 comprises logic for controlling access to respective enterprise applications 114 and data miner 220.

Data broker 205 receives client requests via wired interface 212 or wireless interface 214 that links message broker 110 to one or more input devices 210. Input devices 210 may comprise telephones, personal digital assistants (PDAs), laptop computers, other remote communication devices, as well as desktop computers, workstations, mainframe computers and the like. Message broker 110 logs received client requests, identifies one or more parameters associated with the request, and routes data to appropriate filters. When the filters indicate that the client request should be processed further, the message broker forwards data associated with the client request to data collector 120, which formats select data for aggregation in data model 240.

Data model 240 is coupled to data collector 120 and data mapper 130. Data model 240 comprises a plurality of data sets. Data set A 242, data set B 244, data set C 246, and data set X 248 are shown in the illustrated embodiment. Each of the respective data sets A-X 242, 244, 246, 248 is unique and reflects a host of characteristics such as the originating input device, the client, transaction type, client location, etc.

Data mapper 130 locates, extracts, and formats data from data model 240 in accordance with the various data requirements of third-party vendor applications 116. Data mapper 130 transfers data to a particular third-party vendor application when data model 240 has arranged the requested data in accordance with the format requirements of the vendor. Data mapper 130 is further configured to recognize and suitably arrange data for third-party vendor applications 116, when data model 240 has stored the data in a manner not in accordance with the data format requirements of the third-party vendor application 116. Data manipulation operations within data mapper 130 can range from sequencing, concatenating, and reducing data to decrypting and reencrypting data.

Those skilled in the art will appreciate that various portions of the data broker 205 can be implemented in hardware, software, firmware, or combinations thereof. In one embodiment, the data broker 205 is implemented using a combination of hardware and software or firmware that is stored in a memory and executed by a suitable instruction execution system. It should be noted, however, that the data broker 205 is not dependent upon the nature of the underlying processor and/or memory infrastructure to accomplish designated functions.

If implemented solely in hardware, as in an alternative embodiment, the data broker 205 can be implemented with any or a combination of technologies which are well-known in the art (e.g., discrete logic circuits, application specific integrated circuits (ASICs), programmable gate arrays (PGAs), field programmable gate arrays (FPGAs), etc.), or technologies later developed.

Figure 3:
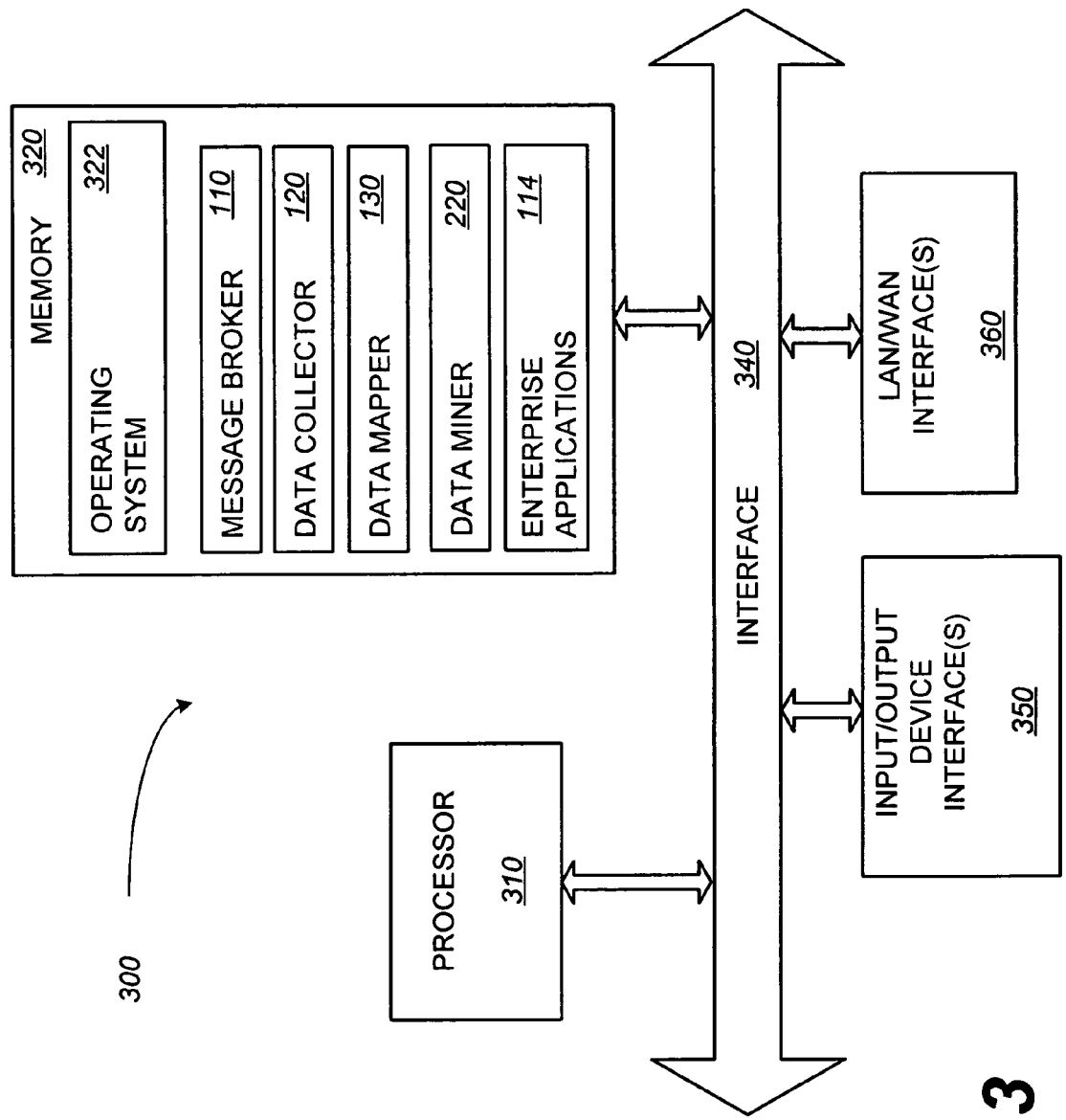
FIG. 3 is a functional block diagram of an embodiment of a computing system suitable for implementing the various functions of the data broker and transactional gateway of FIGS. 1 and 2.

FIG. 3 is a functional block diagram of a computing system suitable for implementing the various functions of the data broker and transactional gateway of FIGS. 1 and 2. The embodiment illustrated in FIG. 3 depicts each of the various functional modules within memory 320. Those of ordinary skill in the art will understand that each of the various functional modules may be implemented in a separate computing device having a memory separate from memory 320 or in combination with one or more of the remaining functional modules. Memory 320 can be an integrated circuit device, an internal hard-disk drive, a magnetic tape drive, a compact-disk drive, and/or other data storage devices now known or later developed that can be made operable with processor 310. In some embodiments, software instructions and/or data associated with the data broker 205 (FIG. 2) may be distributed across several of the above-mentioned data storage devices.

Generally, in terms of hardware architecture, as shown in FIG. 3, the computing device 300 may include a processor 310, memory 320, input/output device interface(s) 350, and LAN/WAN interface(s) 360 that are communicatively coupled via interface 340. Interface 340 can be, for example but not limited to, one or more buses or other wired or wireless connections, as is known in the art or may be later developed. Interface 340 may have additional elements, which are omitted for simplicity, such as controllers, buffers (caches), drivers, repeaters, and receivers, to enable communications. Further, interface 340 may include address, control, and/or data connections to enable appropriate communications among the aforementioned components.

In the embodiment of FIG. 3, the processor 310 is a hardware device for executing software that can be stored in memory 320. The processor 310 can be any custom-made or commercially-available processor, a central processing unit (CPU) or an auxiliary processor among several processors associated with the computing device 300 and a semiconductor-based microprocessor (in the form of a microchip) or a macroprocessor.

Memory 320 can include any one or combination of volatile memory elements (e.g., random access memory (RAM, such as dynamic RAM or DRAM, static RAM or SRAM, etc.)) and nonvolatile memory elements (e.g., read-only memory (ROM), hard drives, tape drives, compact discs (CD-ROM), etc.). Moreover, the memory 320 may incorporate electronic, magnetic, optical, and/or other types of storage media now known or later developed. Note that the memory 320 can have a distributed architecture, where various components are situated remote from one another, but accessible by processor 310.

The software in memory 320 may include one or more separate programs, each of which comprises an ordered listing of executable instructions for implementing logical functions. In the example of FIG. 3, the software in the memory 320 includes message broker 110, data collector 120, data mapper 130, data miner 220, and enterprise applications 114 that function as a result of and in accordance with operating system 322. The operating system 322 preferably controls the execution of other computer programs, such as the message broker 110 and provides scheduling, input-output control, file and data management, memory management, and communication control and related services.

In a preferred embodiment, the various functional modules of data broker 205 (i.e., message broker 110, data collector 120, data mapper 130, and data model 240) comprise one or more source programs, executable programs (object code), scripts, or other collections each comprising a set of instructions to be performed. It will be well-understood by one skilled in the art, after having become familiar with the teachings of the data broker 205, that the data broker 2105 and each of its functional modules may be written in a number of programming languages now known or later developed.

The input/output device interface(s) 350 may take the form of human/machine device interfaces for communicating via various devices, such as but not limited to, a keyboard, a mouse or other suitable pointing device, a microphone, etc. LAN/WAN interface(s) 360 may include a host of devices that may establish one or more communication sessions between the computing device 300 and network 105 (FIG. 1). LAN/WAN interface(s) 360 may include but are not limited to, a modulator/demodulator or modem (for accessing another device, system, or network); a radio frequency (RF) or other transceiver; a telephonic interface; a bridge; an optical interface; a router; etc. For simplicity of illustration and explanation, these aforementioned two-way communication devices are not shown.

When the computing device 300 is in operation, the processor 310 is configured to execute software stored within the memory 320, to communicate data to and from the memory 320, and to generally control operations of the computing device 300 pursuant to the software. Each of the functional modules and the operating system 322, in whole or in part, but typically the latter, are read by the processor 310, perhaps buffered within the processor 310, and then executed.

Each of the functional modules illustrated within memory 320 can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this disclosure, a "computer-readable medium" can be any means that can store, communicate, propagate, or transport a program for use by or in connection with the instruction execution system, apparatus, or device. The computer-readable medium can be, for example but not limited to, an electronic, magnetic, optical, electromagnetic, infrared, or semiconductor system, apparatus, device, or propagation medium now known or later developed. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

While the functional block diagram presented in FIG. 3 illustrates functional modules of the data broker 205 (FIG. 2) in a co-located arrangement, it should be appreciated that the various functional elements of the data broker 205 may be distributed across multiple locations (e.g., with J2EE, NET, enterprise Java beans, or other distributed computing technology). For example, message broker 110, data collector 120, and data mapper 130 can exist in different locations, on different servers, on different operating systems, and in different computing environments because of the flexibility provided in that they interact via only common interchange data. Similarly, data miner 220 and enterprise applications 114 can exist in different computing environments, on different operating systems, and in different computing environments.

Figure 4:
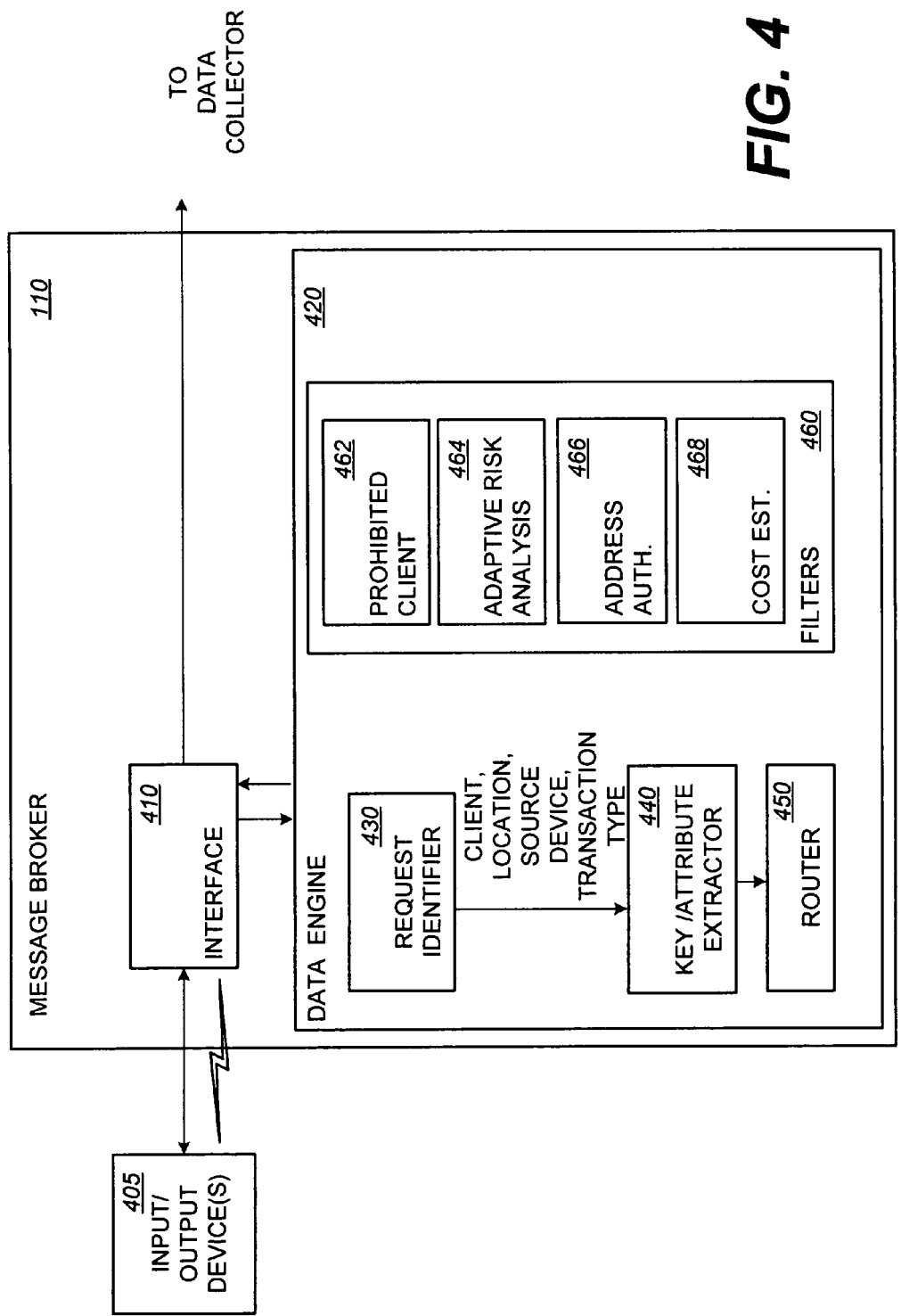
FIG. 4 is a functional block diagram of an embodiment of the message broker of FIG. 2.

FIG. 4 is a functional block diagram of the message broker 110 of FIG. 2. Message broker 110 comprises interface 410 and data engine 420. Interface 410 is configured to accept client requests and distribute responses via both wired and wireless communication links to input/output devices 405. Interface 410 is further configured to communicate data to data collector 120 (FIG. 2) when data engine 420 provides data.

As illustrated in FIG. 4, data engine 420 comprises a request identifier 430, a key/attribute extractor 440, a router 450, and filters 460. Request identifier 430 analyzes data within a client request to identify one or more characteristics of the request. These characteristics include client identifiers, a location, a source device, and a transaction type. Client identifiers may include names, user identifiers separately and in combination with respective passwords such as email addresses and a host of other information regarding client preferences. Locations may include billing addresses, shipping addresses, geographic areas, and the like. Source devices may comprise PDAs, telephones, computing devices. Source devices may be further identified based on whether the client request was communicated by a wired or a wireless interface and the corresponding communication protocol. Transaction types include inquiries regarding inventory, price, applicable discounts, tax rates, shipping rates, and can be further distinguished whether the client is interested in a lease or a purchase. Transaction types further include credit transactions and fund transfers.

As further illustrated in the functional block diagram of FIG. 4, the identified client, location, source, and transaction parameters are forwarded to key/attribute extractor 440. Key/attribute extractor 440 applies one or more data extraction algorithms over the client request. Extracted data keys and attributes are forwarded to router 450, which adaptively applies the client data to one or more filters 460.

Filters 460 comprise one or more filters 462, 464, 466, 468 configured to recognize a transaction or other client request that originated from a prohibited or otherwise restricted client/transaction as well as relatively risky transactions. For example, prohibited client 462 filter may comprise a single filter that identifies clients that an enterprise does not want to deal with because of previously identified issues. In alternative embodiments, prohibited client filter 462 may comprise an adaptive multi-stage filter that further identifies clients/transactions prohibited because of a government prohibition of exports of particular technology to a certain geographic region. Additional filters comprise an adaptive transaction risk analysis filter 464 and an address authentication filter 466. Adaptive risk analysis filter 464 is configured to generate a risk level in response to one or more characteristics of the transaction request. Address authentication filter 466 is configured to establish whether the client has communicated a recognizable billing address and/or a shipping address that a particular shipper will service. Other filters, including cost estimator 468 may comprise tax estimators, shipping cost estimators and the like.

Figure 5:
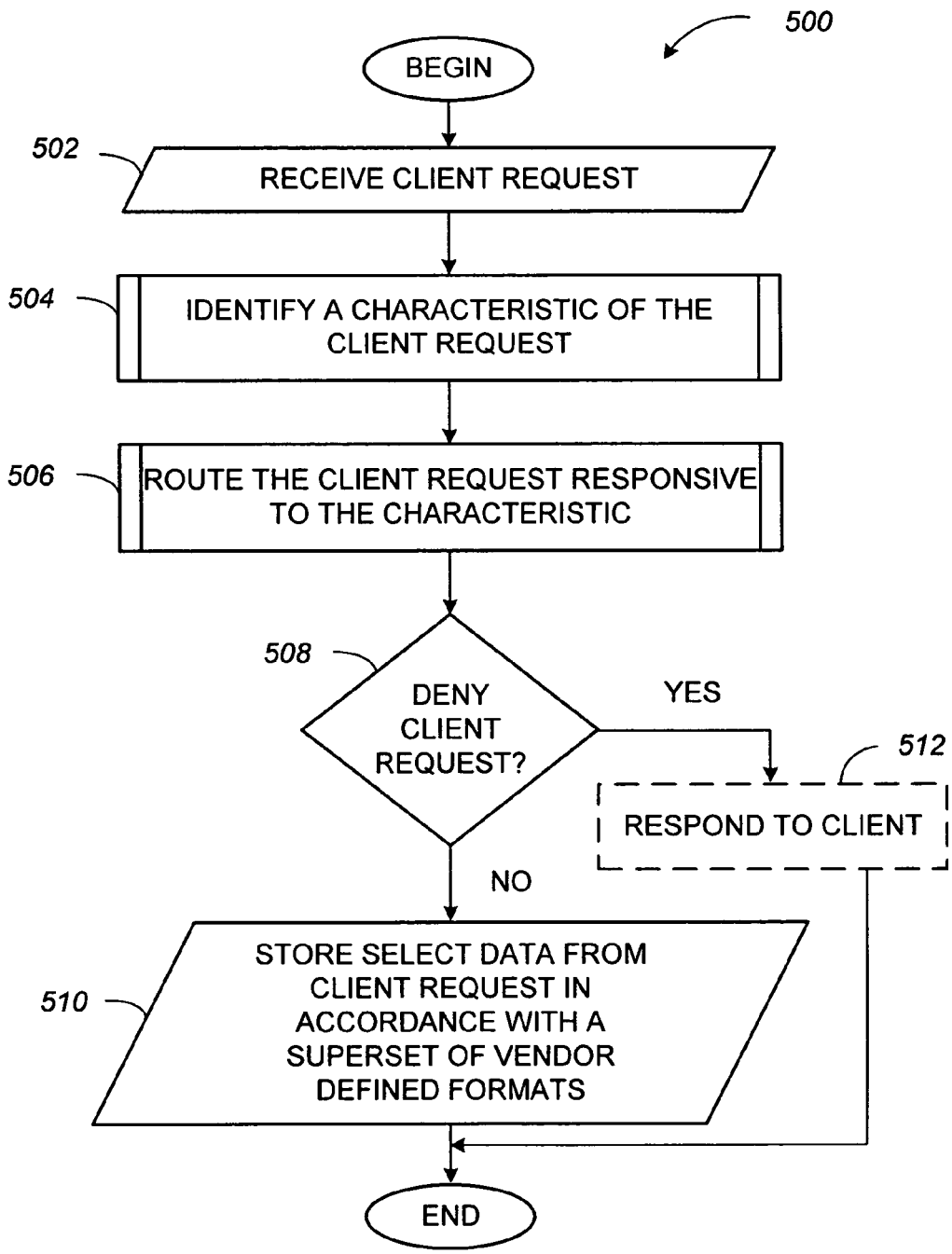
FIG. 5 is a flow diagram illustrating an embodiment of a method for brokering data in a transactional gateway.

FIG. 5 is a flow diagram illustrating an embodiment of a method 500 for brokering data in a transactional gateway. Method 500 begins by receiving a client request as shown in input/output block 502. Once the client request is received, an appropriately configured interface identifies at least one characteristic associated with the client request as indicated in block 504.

As described above, a client request in a transactional gateway designated for integrating enterprise systems with payment processing services and financial institutions include client identifiers, a location, an originating source device, a transaction type, etc. Client identifiers include name, age, event dates, passwords, among others. Transaction locations may include a billing address, a shipping address, a warehouse address, a geographic area where the client was when the request was communicated and the like. Source devices define a host of various communication devices that may be used by clients that interact with the transactional gateway via the brokering system. As described above, source devices include wired and wireless telephones, PDAs, notebook computers, desktop computers, mainframe computers, etc. Transaction types comprise requests for quotes, shipping information, purchases, leases, supplies, inventory, etc.

Once one or more characteristics of the client request have been identified, the client request is routed to appropriate processing modules or filters in accordance with at least one characteristic as shown in block 506. Thereafter, as illustrated in decision block 508, a determination is made whether to deny or otherwise terminate the client request. When it is determined that the client request should be processed, as indicated by the flow control arrow labeled "NO" exiting decision block 508, select data from the client request is stored in a data store comprising a superset of vendor defined formats for receiving data as shown in input/output block 510. Otherwise, when it is determined that the client request should not be processed, as indicated by the flow control arrow labeled "YES" exiting decision block 508, the request status may be communicated in a response to the requesting client as indicated in optional block 512 or the method 500 may be terminated without responding to the client.

The flow diagram of FIG. 6 presents an alternative embodiment of a method for brokering data in a transactional gateway. Method 600 begins by receiving a client transaction request as shown in input/output block 602. Once the client transaction request is received, an appropriately configured interface identifies the requesting source as indicated in block 604.

Next, as shown in block 606, an appropriately configured processor extracts data keys and attributes in accordance with the identified source. Thereafter, as illustrated in block 608, select data from the client transaction request is routed in response to the data keys and attributes extracted in block 606. As shown in block 610, the select data is applied to one or more appropriately configured filters to perform a preliminary analysis on the transaction request.

As illustrated in decision block 612, a determination is made whether a response can be sent to the requesting client. When it is determined that a response can be sent, as indicated by the flow control arrow labeled "YES" exiting decision block 612, a response is generated and communicated to the requesting client as indicated in block 614. As shown by connector B, method 600 terminates after responding to the client. A host of conditions can warrant a response to the client. For example, a response may be appropriate when the requesting client has asked to purchase equipment that the enterprise is prohibited from exporting to the client. The client may have been previously identified as a party that the enterprise would not wish to engage in future business transactions. A fraud detection algorithm may indicate that the present request may be of a fraudulent nature. Under this and other circumstances, the enterprise may elect to respond to the requesting client with one or more questions in an attempt to confirm the identity of the requesting party. Alternatively, the enterprise may want to spoof a transaction in an attempt to collect additional information about the party perpetrating the fraud. Otherwise, when it is determined that a client response can not be sent and the client request should be processed, as indicated by the flow control arrow labeled "NO" exiting decision block 612, select data from the client transaction request is stored in a data model that comprises a superset of vendor defined formats for receiving transactional data as shown in input/output block 616.

Method 600 continues as indicated by connector A with block 618 when in response to a third-party vendor request for data (pull data transaction) or an enterprise initiated data transaction with a third-party vendor (push data transaction) stored data is located. Once the data is located, the data is mapped in accordance with third-party vendor data requirements as shown in block 620. Data mapping may include formatting in the nature of ordering, concatenating, cropping, encoding, etc. Data mapping may also include decrypting stored data and reencrypting decrypted data using a data encryption scheme compatible with the third-party vendor. Next, as indicated by input/output block 622 data is forwarded or otherwise communicated to the third-party vendor.

Transactional data stored in the data model can be further accessed by enterprise applications. As indicated in input/output block 624 an access request is received from an enterprise application. A determination is made in decision block 626 whether to permit the enterprise application to access stored data. When it is determined that an enterprise application should be permitted access to the data, as indicated by the flow control arrow labeled, "YES" exiting decision block 626, select data is located within the data model as indicated in block 628. Data is forwarded to the requesting enterprise application as shown in input/output block 630. Otherwise, when it is determined that an enterprise application should not be permitted access to data stored in the data model, as indicated by the flow control arrow labeled "NO" exiting decision block 626, access is not granted and method 600 terminates.

Figure 6A:
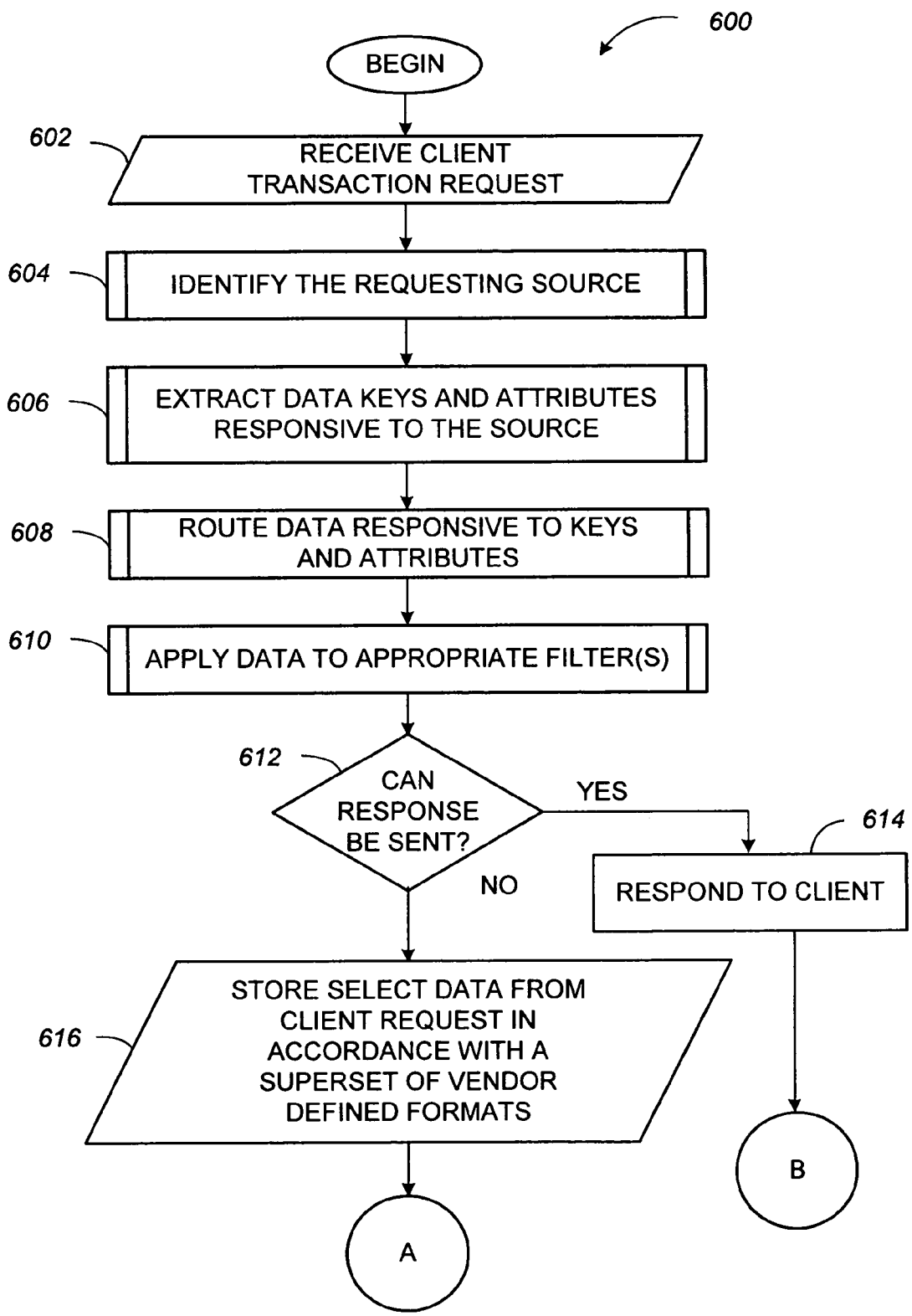
FIGS. 6A and 6B illustrate an alternative embodiment of a method for brokering data in a transactional gateway.
Figure 6B:
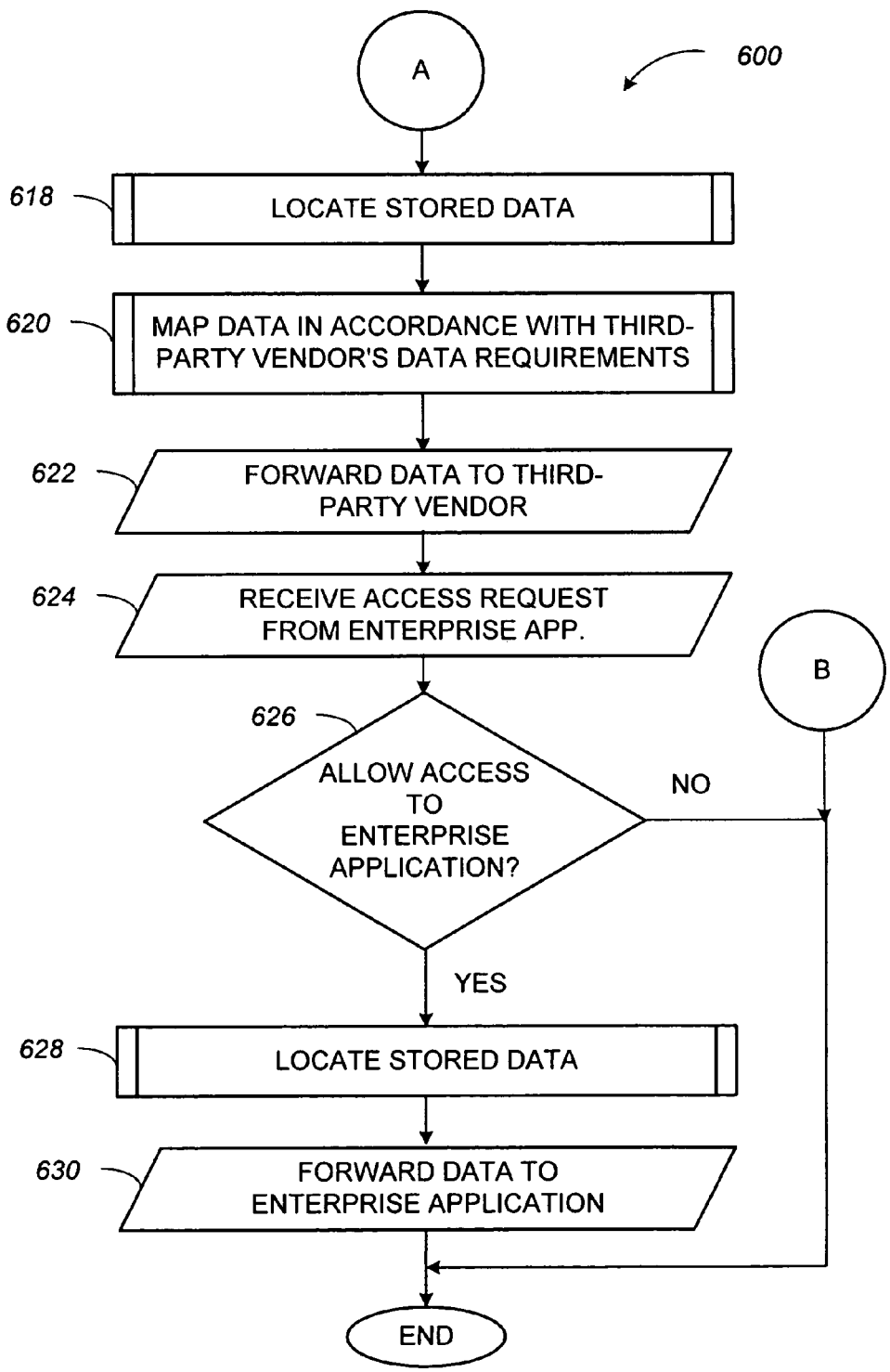

Any process descriptions or blocks in the flow diagrams presented in FIGS. 5, 6A, and 6B, should be understood to represent modules, segments, or portions of code or logic, which include one or more executable instructions for implementing specific logical functions or steps in the associated process. Alternate implementations are included within the scope of the present system in which functions may be executed out of order from that shown or discussed, including substantially concurrently or in reverse order, depending on the functionality involved, as would be understood by those reasonably skilled in the art after having become familiar with the teachings of the present brokering system.

We claim:

1. A system for producing a common data model, comprising:
    a computer processor;
    a memory storing program code the computer processor configured to execute, the program code comprising:
    a message broker module comprising an interface configured to receive client requests in a plurality of data formats from a plurality of types of communication devices; a transaction request identifier configured to identify a plurality of parameters associated with a received client request, and a router configured to distribute the received client request responsive to at least one of the plurality of parameters, the message broker module further comprising a plurality of filters configured to apply at least one test for determining when the received client request should be processed by the message broker, wherein a first filter identifies whether the received client request is associated with a fraudulent request, the first filter further identifying that a response should be sent to a client associated with the fraudulent request to mimic a legitimate transaction;
    a data mapper module coupled to each of a plurality of data stores and configured to locate, extract, and format data from the plurality of data stores in accordance with an output data format of at least one of a vendor interface and an enterprise applications, the data mapper module outputting formatted data and further configured to forward the formatted data to the at least one of the vendor interface and the enterprise application and further configured to forward the formatted data responsive to a hierarchical structure within a class; wherein the at least one of the vendor interface and the enterprise application perform at least one of an electronic funds transfer, a fraud analysis, and an authentication operation; and
    a data collector module coupled to the message broker module and configured to store data from the received client request in at least one of the plurality of data stores when at least one of the plurality of filters indicates that the received client request should be processed by the data mapper module.

2. The system of claim 1, wherein the message broker module is further coupled to a wireless interface.

3. The system of claim 1, wherein the message broker module is further coupled to a wired interface.

4. The system of claim 1, wherein the plurality of parameters comprises at least one of a source, a client, a location, and a transaction type.

5. The system of claim 1, wherein at least one of the plurality of filters comprises a test configured to identify a prohibited client.

6. The system of claim 1, wherein at least one of the plurality of filters comprises a test configured to identify a risk level.

7. The system of claim 1, wherein at least one of the plurality of filters applies an adaptive algorithm.

8. The system of claim 1, wherein at least one of the plurality of filters applies an address verification.

9. The system of claim 8, wherein the at least one of the plurality of filters further applies a tax rate.

10. The system of claim 1, wherein the vendor interface is coupled to a financial institution.

11. The system of claim 1, wherein the data mapper module comprises a translator configured to modify encrypted data.

12. The system of claim 1, wherein the enterprise application comprises a proprietary credit analysis.

13. The system of claim 1, wherein the enterprise application comprises a product configuration tool.

14. The system of claim 13, wherein the product configuration tool comprises a leasing application.

15. The system of claim 14, wherein the product configuration tool further comprises a financing module.

* * * * *